US012300941B2

(12) United States Patent
Si et al.

(10) Patent No.: US 12,300,941 B2
(45) Date of Patent: May 13, 2025

(54) I/O CONNECTOR CAGE WITH HIGH SHIELDING EFFECTIVENESS

(71) Applicant: Amphenol Corporation, Wallingford, CT (US)

(72) Inventors: Jason Si, Toronto (CA); R. Brad Brubaker, Etters, PA (US); Brian Kirk, Amherst, NH (US)

(73) Assignee: Amphenol Corporation, Wallingford, CT (US)

( * ) Notice: Subject to any disclaimer, the term of this patent is extended or adjusted under 35 U.S.C. 154(b) by 288 days.

(21) Appl. No.: 17/834,622

(22) Filed: Jun. 7, 2022

(65) Prior Publication Data

US 2022/0393404 A1 Dec. 8, 2022

Related U.S. Application Data

(60) Provisional application No. 63/208,200, filed on Jun. 8, 2021.

(51) Int. Cl.
*H01R 13/6583* (2011.01)
*H01R 43/26* (2006.01)

(52) U.S. Cl.
CPC ......... *H01R 13/6583* (2013.01); *H01R 43/26* (2013.01)

(58) Field of Classification Search
CPC .... H01R 43/26; H01R 13/6583; H01R 13/11; H01R 13/652; H01R 13/648
See application file for complete search history.

(56) References Cited

U.S. PATENT DOCUMENTS 7,037,136 B1 * 5/2006 Korsunsky ......... H01R 13/6594 361/728
7,170,013 B2 * 1/2007 Lewis .................. H05K 9/0016 174/355
7,455,554 B2 * 11/2008 Long .................... G02B 6/4256 439/607.17
7,758,381 B2 * 7/2010 Oki .................... H01R 13/6582 439/607.17

(Continued)

FOREIGN PATENT DOCUMENTS

WO WO-2021154415 A1 * 8/2021 ......... H01R 13/6583

OTHER PUBLICATIONS

[No Author Listed], Specification for OSFP Octal Small Form Factor Pluggable Module. OSFP MSA. Rev 5.0. Oct. 2, 2022. 131 pages.

*Primary Examiner* — Marcus E Harcum
(74) *Attorney, Agent, or Firm* — Wolf, Greenfield & Sacks, P.C.

(57) ABSTRACT

A spring seal for a cage of a high speed I/O connector, such as those compliant with an OSFP standard. The spring seal suppresses resonances in the operating frequency range of the connector in a space between the cage and a transceiver inserted in a channel of the cage to mate with the I/O connector. The spring seal has multiple peaks, separated by valleys, with short conducting paths between the peaks and valleys. The spring seal may connect a conductive exterior of the transceiver to a wall of the cage, with the peaks contacting a conductive exterior of the transceiver and the valleys contacting walls of the cage. The spring seal may have a plurality of slits that reduce the spring force while providing conducting paths between peaks and valleys.

20 Claims, 6 Drawing Sheets

(56) References Cited

U.S. PATENT DOCUMENTS

| | | | | |
|---|---|---|---|---|
| 8,550,861 | B2 * | 10/2013 | Cohen | H01R 12/72 439/607.05 |
| 9,373,901 | B2 * | 6/2016 | Singer | H01R 13/6583 |
| 9,397,450 | B1 * | 7/2016 | Feng | H01R 13/7175 |
| 9,620,907 | B1 * | 4/2017 | Henry | H01R 13/6582 |
| 9,666,997 | B1 * | 5/2017 | Henry | H01R 13/659 |
| 9,831,613 | B2 * | 11/2017 | Liu | H01R 13/6583 |
| 9,882,297 | B2 * | 1/2018 | Regnier | H01R 24/30 |
| 10,104,793 | B2 | 10/2018 | Briant et al. | |
| 11,056,838 | B2 * | 7/2021 | Biddle | G02B 6/4277 |
| 2007/0093099 | A1 * | 4/2007 | Kuo | H01R 13/6583 439/159 |
| 2013/0048367 | A1 * | 2/2013 | Ljubijankic | H01R 13/6583 174/354 |
| 2014/0295704 | A1 * | 10/2014 | Curtis | H01R 13/6583 439/607.26 |
| 2014/0340864 | A1 * | 11/2014 | Wu | H05K 9/0018 361/818 |
| 2017/0054234 | A1 * | 2/2017 | Kachlic | H01R 13/6583 |
| 2019/0067878 | A1 * | 2/2019 | Xie | H01R 13/6583 |
| 2019/0363494 | A1 * | 11/2019 | Sharf | H01R 13/6582 |
| 2020/0106231 | A1 * | 4/2020 | Katz | H01R 43/16 |
| 2020/0212633 | A1 * | 7/2020 | Masunaga | H01R 12/79 |
| 2020/0343673 | A1 * | 10/2020 | Poh | H01R 13/6594 |
| 2021/0050692 | A1 * | 2/2021 | Yang | H01R 13/6583 |
| 2021/0098927 | A1 | 4/2021 | Si et al. | |
| 2021/0384691 | A1 * | 12/2021 | Winey | H01R 13/6587 |
| 2022/0045462 | A1 * | 2/2022 | Duan | H01R 13/6587 |
| 2022/0115816 | A1 * | 4/2022 | Huang | H01R 12/75 |
| 2022/0344875 | A1 * | 10/2022 | Yang | H01R 13/6581 |

* cited by examiner

I/O CONNECTOR CAGE WITH HIGH SHIELDING EFFECTIVENESS

CROSS-REFERENCE TO RELATED APPLICATIONS

This application claims priority to and the benefit of U.S. Provisional Application Ser. No. 63/208,200, filed Jun. 8, 2021, entitled "I/O CONNECTOR CAGE WITH HIGH SHIELDING EFFECTIVENESS." The entire contents of this application are incorporated herein by reference in their entirety.

BACKGROUND

The techniques described herein relate generally to interconnection systems and more specifically to designs for reducing electromagnetic interference and/or improving high frequency performance in electronic devices.

Electronic devices are often connected, whether to enable those devices to communicate over networks or because those devices form part of the network. For example, servers are often connected to a network to exchange data with other servers or end user devices. Similarly, routers and switches are often connected to form a network or connected to devices that are using the network to exchange data.

Often such connections are made through I/O connectors inside the devices mated with plugs terminating cables that are routed between the electronic devices. The I/O connectors are configured as receptacles that mount to a printed circuit board and mate with a plug. The receptacles may be mounted near an edge of a printed circuit board to which components forming the electronic device are attached. That edge may be next to a panel of an enclosure holding the printed circuit board and possibly other subassemblies that constitute the electronic device.

To enable a plug to be inserted into a receptacle, the panel may have openings through which a plug may be inserted to mate with the receptacle. An opening in the panel, however, can allow electromagnetic radiation to escape from the enclosure or, conversely, for radiation to enter the enclosure through the panel. Radiation passing through a panel of electronic device can lead to undesirable interference between electronic devices or even between different portions of the same electronic device.

To reduce electromagnetic interference (EMI), receptacle connectors are often enclosed in a grounded metal structure, referred to as a cage. The cage may have one or more channels, each shaped to receive a plug and aligned with both a panel opening and a mating interface of a receptacle. The plug may be inserted through the panel opening into the channel, such that the plug and receptacle mate inside the cage. In this state, the cage blocks radiation from inside the device from reaching the panel opening. Further, the plug may have a conductive exterior that is also grounded, which blocks radiation from the plug or receptacle from exiting the cage through the channel.

To enhance the effectiveness of the cage and plug at blocking electromagnetic radiation, one or more components that act as electromagnetic seals may be used. A conductive gasket may be positioned between the cage and the perimeter of the panel opening to reduce the radiation escaping from any opening between the cage and the panel. Additionally, spring fingers may be mounted in the mouth of the channel. These spring fingers may be biased outwards from the channel walls to make contact with the conductive exterior of the plug, blocking the openings between the plug and the cage.

In this way, a substantial amount of radiation that might otherwise escape the enclosure through the panel opening is blocked by the cage and plug. Radiation that might enter the enclosure is likewise blocked, which also reduces EMI.

The effectiveness of a component, such as a cage or spring fingers, in blocking radiation from passing through an opening may be expressed as shielding effectiveness. Shielding effectiveness may be measured as the percentage decrease in radiation that passes through a panel opening with the component in place relative to when the component is absent.

SUMMARY

Aspects of the present disclosure may be embodied as a spring seal for a cage of a connector assembly configured to receive a plug inserted in an insertion direction. The spring seal may comprise a conductive sheet comprising a plurality of peaks separated in the insertion direction.

Aspects of the present disclosure may be embodied as a connector assembly, comprising a receptacle connector within a cage comprising a channel with an opening and a plurality of spring seals disposed at the opening of the channel. Each of the plurality of seals may comprise a corrugated sheet comprising a plurality of peaks and a plurality of valleys, with conducting paths between each of the plurality of peaks and an adjacent valley of the plurality of valleys having a length of 1 mm or less.

Aspects of the present disclosure may be embodied as a method of operating an electronic assembly comprising a receptacle accessible within a channel of a cage having a spring seal at an opening to the channel. The method may comprise inserting a transceiver through the opening to the channel, contacting a first convex surface of the spring seal at a first distance from the opening, contacting a second convex surface of the spring seal at a second distance from the opening, and contacting a third convex surface of the spring seal at a third distance from the opening, such that the spring seal is compressed between the transceiver and a wall of the cage.

The foregoing is a non-limiting summary of the invention, which is defined by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated structures for enhancing the shielding effectiveness of an I/O connector assembly including a cage. Increased shielding effectiveness may be provided by a spring seal between a cage and a pluggable component with a plurality of segments, each of which can make contact with a wall of the cage in multiple locations spaced apart in an insertion direction of the transceiver into the cage.

The spring seal may have a plurality of peaks and valleys. The peaks may be orientated to contact the exterior housing of a transceiver or other pluggable component and the valleys may be oriented to contact the walls of a cage. Separation, in a direction perpendicular to the wall of the cage, between the peaks and valleys when the spring is in an uncompressed state, may be larger than the tolerance in positioning between the exterior of the transceiver housing and the cage wall, which will result in the spring seal being compressed in a direction toward the wall of the cage when the transceiver is inserted in the cage.

Figure 1:
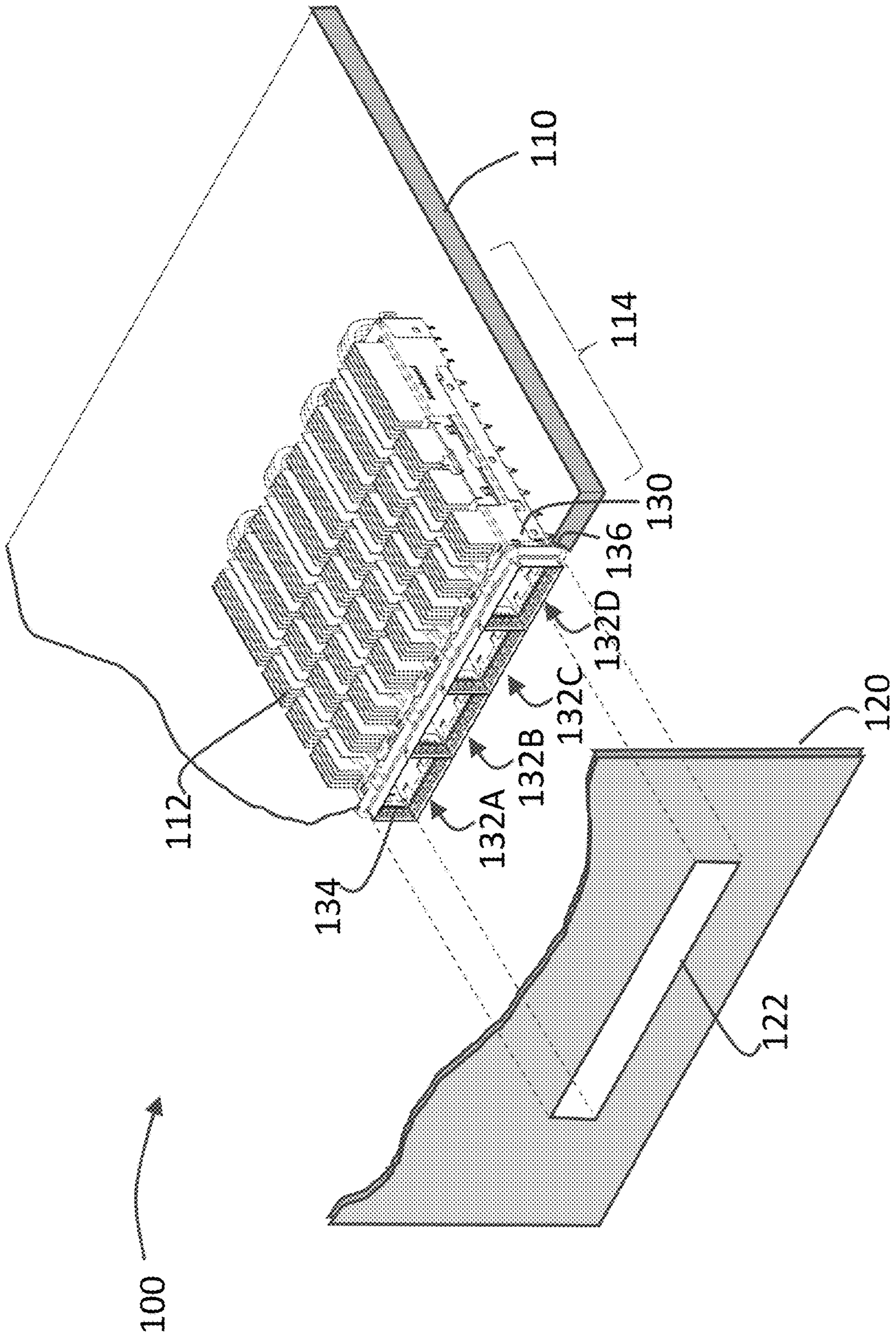
FIG. 1 is an isometric view of an electronic device, partially exploded and partially cut away, with an I/O connector assembly with an exemplary embodiment of an improved spring seal.

FIG. 1 illustrates an electronic assembly 100 with a printed circuit board 110 and a connector assembly mounted 112 to an edge 114. The connector assembly 112 is positioned for insertion in an opening 122 of a panel 120 forming an enclosure that will enclose the electronic assembly 100. In this example, the connector assembly 112 is configured to hold four receptacle connectors, and a ganged cage 130 with four channels 132A, 132B, 132C, and 132D is shown. Each of the channels is shown with the same type of seal.

In the illustrated embodiment, an EMI seal 134 at the opening of each channel of the cage is formed by spring seals as described herein mounted to all four interior walls at the opening into each channel. In this exemplary embodiment, each spring seal is formed from a sheet of metal. The walls of the cage may be formed of stainless steel and the spring seal may be formed from a material that is less likely to yield when compressed. For example, the spring seal may be stamped from a sheet of phosphor bronze. The spring seal may include a plating, such as nickel plating.

Figure 2:
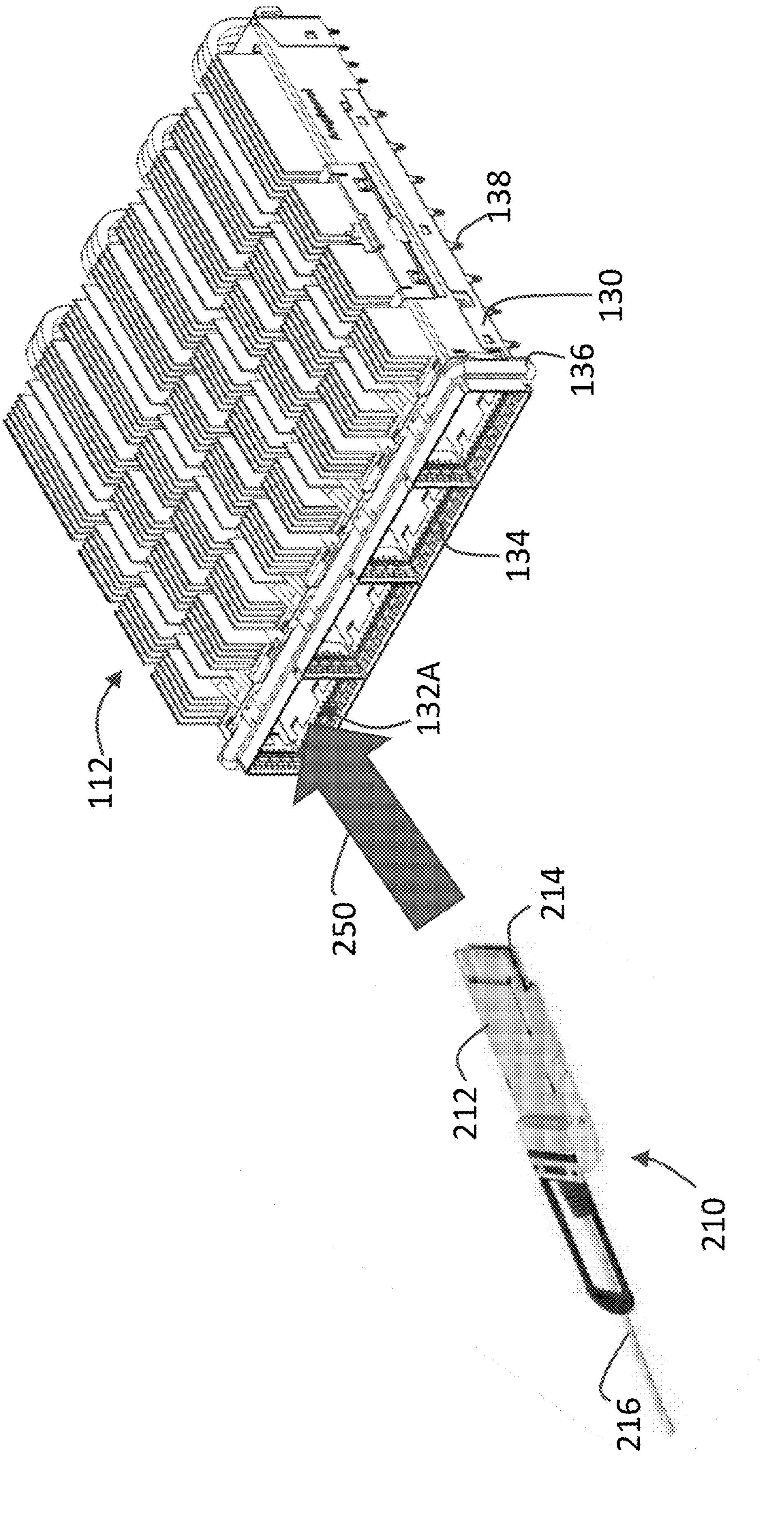
FIG. 2 is an isometric view of the I/O connector assembly of FIG. 1 and a transceiver configured as a plug positioned for insertion into a channel of the cage of the connector of FIG. 1.

FIG. 2 illustrates the insertion of a transceiver 210 into cage 130. As can be seen in FIG. 2, transceiver 210 terminates a cable 216 and may make connections between cable 216 and components on PCB 110 through a receptacle connector of connector assembly 112. The transceiver is moved in an insertion direction 250 into a channel, here channel 132A, of the cage 130 such that a forward end 214 of the transceiver may connect to a receptacle connector (not visible in FIG. 2) at the rear portion of a channel of cage 130.

The transceiver may have a conductive exterior 212 that is contacted at multiple locations along the insertion direction by the spring seals lining the walls of the channel at its opening. As can be seen in FIG. 2, cage 130 includes features for connecting the cage to ground structures in a PCB to which the cage is mounted. In this example, press fits 138 extend from cage 130 for this purpose. As cage 130 is grounded, connecting the exterior 212 of the transceiver to the cage through the spring seal provides a common ground for the cage and transceiver housing.

Figure 3:
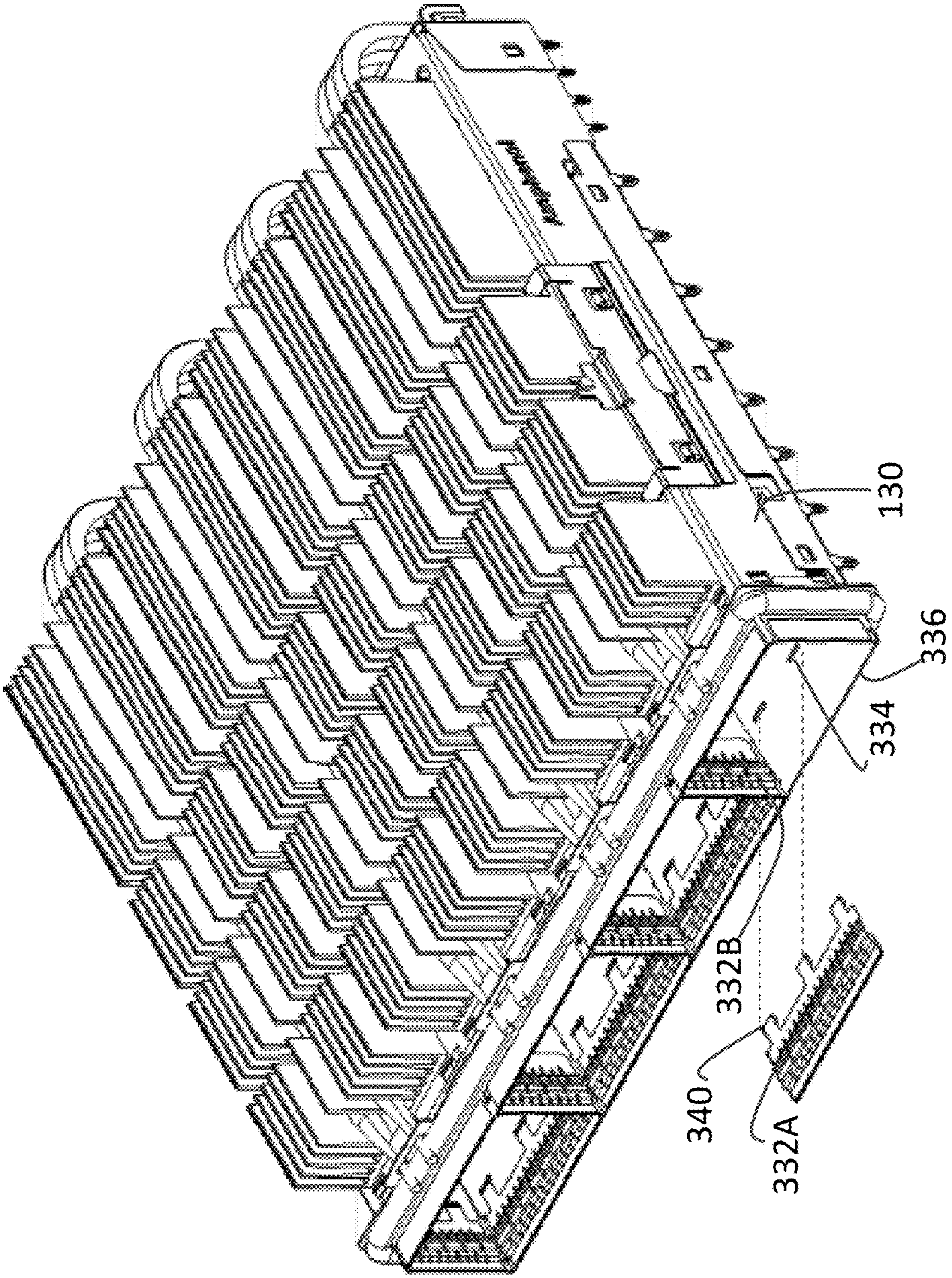
FIG. 3 is an isometric view of the I/O connector assembly of FIG. 1 with an exemplary embodiment of an improved spring seal exploded.

FIG. 3 illustrates a spring seal 332A exploded from one wall of a channel of the cage. A second spring seal 332B is visible on a second, orthogonal wall of the channel. In the illustrated embodiment, the spring seals on each wall of the cage have similar arrangements of peaks and valleys. Each spring seal may also have the same type of attachment features for attaching the spring seal to the cage. Likewise, the spring seals may be formed of the same material and all spring seals may function in the same way. The spring seals on different walls, however, may differ in length.

Figure 4:
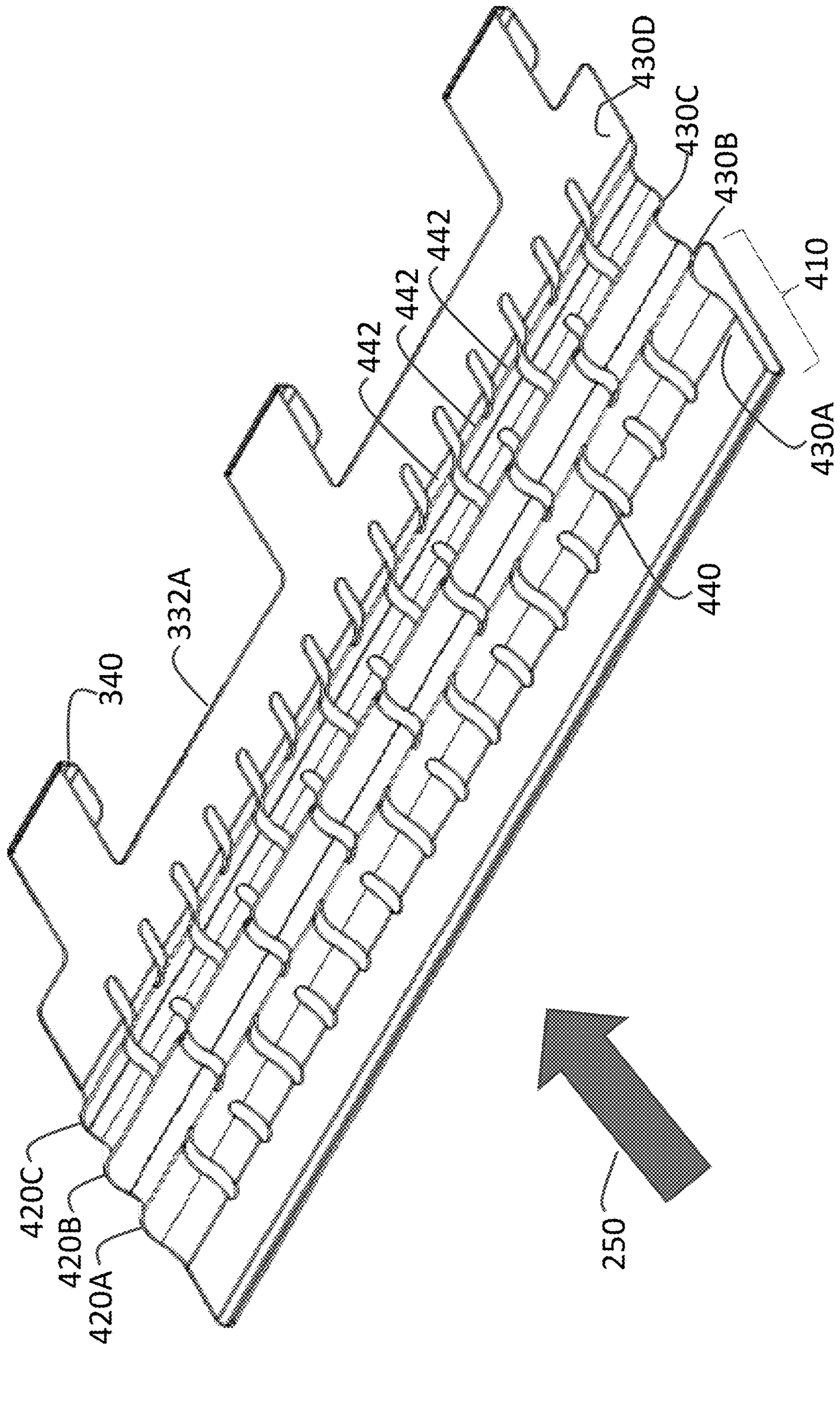
FIG. 4 is an enlarged view of the spring seal of the embodiment of FIG. 3.

As can be seen, such as in FIG. 4, the spring seal, such as spring seal 332A, has an attachment mechanism at the front and rear for attaching to the wall of the cage. In this example, the attachment mechanism at the front is a clip 410, which is formed by folding over a metal sheet forming the spring seal, such that the spring seal clips on at the front edge of the cage wall. In such an embodiment, the spring seal may be held to the cage at the front by friction. Alternatively or additionally, the spring seal might be welded at the front to the cage or otherwise fixedly coupled to the cage. In yet further embodiments, attachment at the front may be omitted, with the spring seal retained via hooks or other attachment mechanism at the rear.

A spring seal may alternatively or additionally include an attachment mechanism at the rear. In the embodiment of FIG. 3, the spring seal is attached at the rear with projections 340 that engage a wall 336 of the cage. Here, the projections are inserted into slots 334 in the wall 336 of the cage. In this example, the projections 340 are shaped as hooks. The attachment mechanism may provide a movable coupling. In the illustrated example, the hooks are oriented to preclude withdrawing the spring seal from the cage but enabling the rear of the spring seal to move into the cage. To enable this motion, the slots 334 may have a width in a direction parallel to the insertion direction 250 that is greater than the thickness of the hook inserted into the slot.

FIG. 4 is an enlarged view of a spring seal. In this example, the spring seal is formed from a single sheet of metal. A folded over forward portion, forming clip 410, and projections 340 with rear hooks are visible to the rear. In addition, the sheet is formed with multiple peaks, here illustrated as peaks 420A, 420B and 420C and valleys, here shown as valleys 430A, 430B, 430C and 430D. In the illustrated example, a valley 430B or 430C is between each pair of adjacent peaks. A further valleys 430A and 430D bound the peaks at the forward and rearward ends of the spring seal. In this example, the peaks and valleys have smooth surfaces, providing alternating concave and convex portions, and providing a corrugated shape. The peaks and valleys here are elongated in a direction transverse to the insertion direction 250. In the example of FIG. 4, there are three peaks, with four valleys.

In this example, slits 440 are cut in the shield. In this example, the slits 440 have elongated dimensions parallel to the insertion direction. In the example illustrated, the slits are cut in interior portions of the metal sheet forming the spring seal such that the slits have closed perimeters. The slits 440 are transverse to the elongated dimension of the peaks and valleys. Such an orientation leaves multiple segments 442 providing conducting paths between the slits and connecting the peaks and valleys.

The slits 442 may modify the stiffness of the shield. In the illustrated embodiment, there are more slits at the front and rear than in the central portion. The density of openings is therefore greater at the front and rear than in the central portion. In the illustrated example, the average spacing between slits at the front and rear is about half that in the central portion. The average spacing between slits in the front and rear portion may be, in some examples, between 30% and 70% of the average spacing in the central portion. Such a configuration provides for a stiffer spring force from the central portion of the shield with lesser spring force at the front and back.

Figure 5:
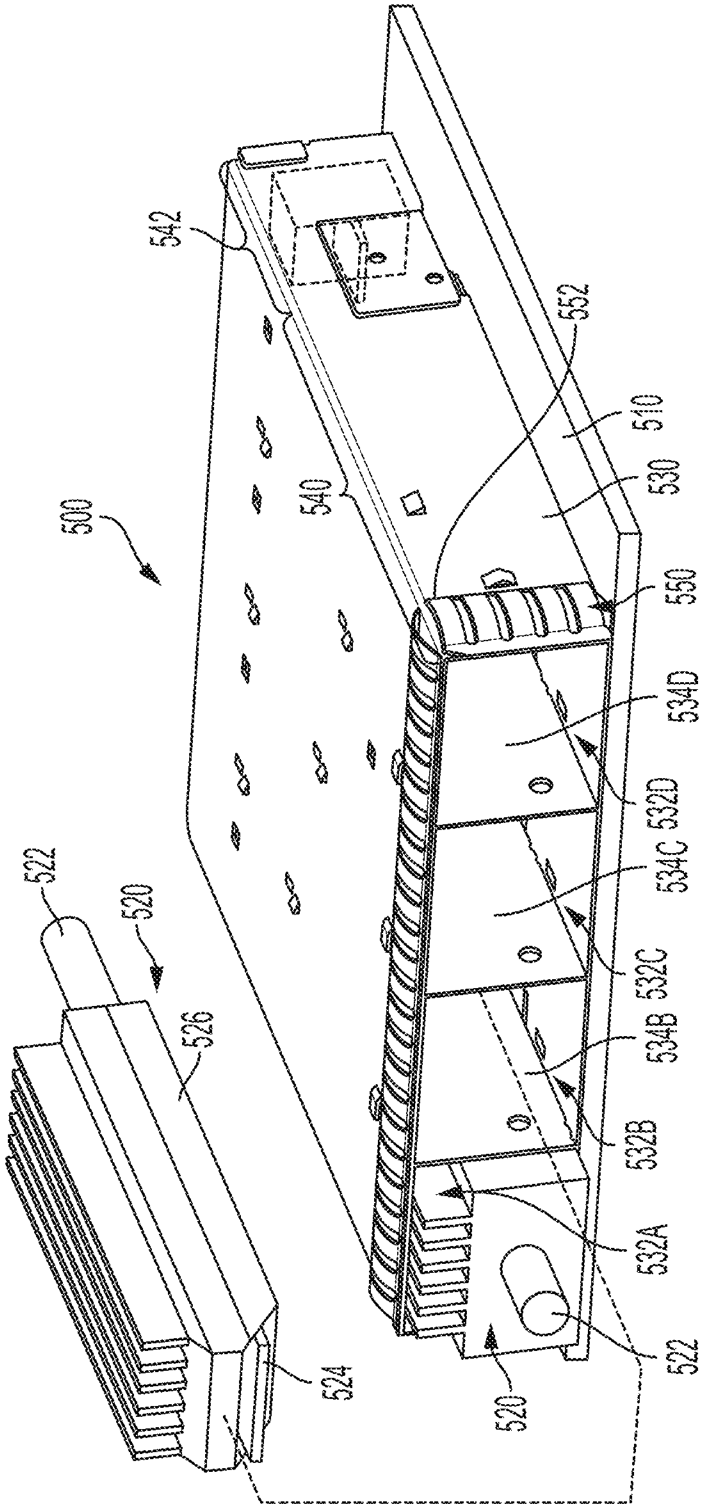
FIG. 5 PRIOR ART
FIG. 5 is an isometric view of a cage with a conventional spring shield.

FIG. 5 illustrates an electronic assembly 500 with a cage 530 with a conventional spring shield 550. Cage 530 includes four channels 532A, 532B, 532C and 532D. As with cage 130, described above, each of the channels includes a rear portion 542 that encloses a receptacle connector (illustrated in phantom lines in FIG. 5). A front portion 540 of the channel receives a transceiver 520. As described above in connection with transceiver 210, the transceiver is connected to a cable 522 and has a forward end 524 configured to mate with the receptacle connector. Transceiver 520 may make connections between cable 522 and components on PCB 510 through the receptacle connector. As can be seen in FIG. 5, the insertion direction of the cage extends from the openings of the channels to the rear portions 542 where a receptacle connector is enclosed by the cage.

The spring shield 550 as shown in FIG. 5 has a plurality of spring fingers 552, without the plurality of peaks as illustrated in FIG. 4. In this example, the spring shield is attached on the outside of the cage, providing a seal between the cage and a panel opening. But spring shields with spring fingers as illustrated in FIG. 5 may also be used inside the channel of a cage between the cage and a transceiver inserted in the cage. For example, transceiver 520 may have a conductive exterior 526. When transceiver 520 is inserted into a channel of cage 530, one or more spring shields 550 may make connections between the exterior 526 and a wall of the cage. Spring shields 550, for example, may be attached to vertical walls, of which vertical walls 534B, 534C, and 534D are visible.

In the example of FIG. 1, a separate seal 136 is used between the cage and the panel opening. In that example, the external seal 136 is a conductive elastomer. A spring seal as described herein may alternatively or additionally be used external to the cage in the same configuration as in FIG. 5 or in place of the elastomer seal 136.

As can be seen in FIG. 5, a spring finger 552 has a single curved portion that can make one point of contact with respect to counter component, such as the panel wall for an exterior seal or a transceiver for an internal seal.

Figure 6:
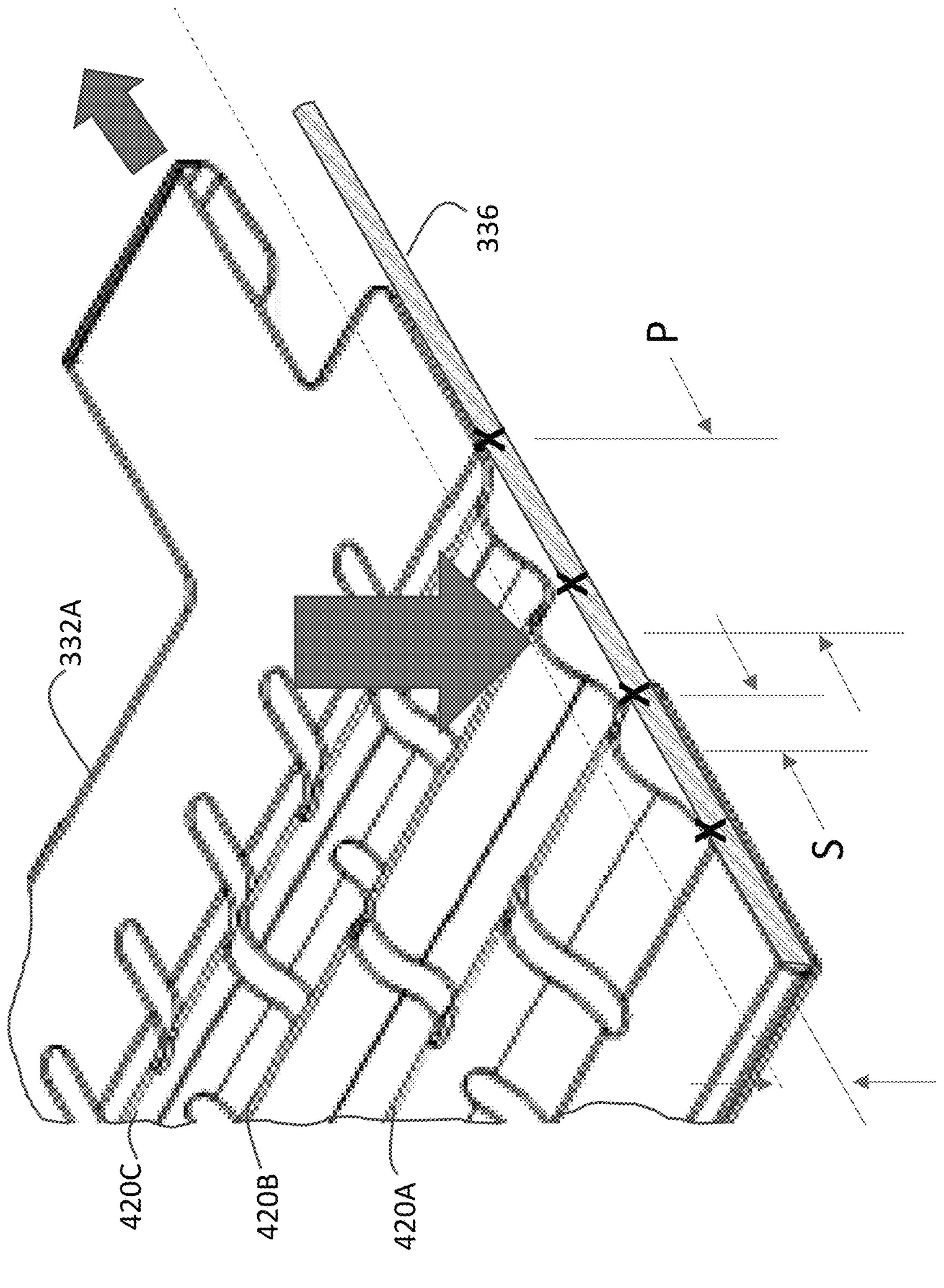
FIG. 6 is a sketch illustrating a plurality of shorter conductive paths between a conductive exterior of a plug and a cage through the spring seal of the embodiment of FIG. 3.

FIG. 6 shows a spring seal 332A as in FIG. 4 clipped to an edge of a wall 336 of a cage. In the embodiment shown, there are three peaks 420A, 420B, 420C oriented for contacting an exterior housing of a transceiver inserted into the cage. When a transceiver or other component is pressed against the shield, each peak will form a point of contact with the transceiver. In this example, there will be three points of contact between the spring shield and the transceiver.

There will be conducting paths through the shields between each of these points of contact at the peak and the locations designated by X's on the wall of the cage. In this example, there are conducting paths between each peak and the wall of the cage extending in both directions from the peak. These paths are relatively short. For example, in this example the spring seal may be formed with a height H in an uncompressed state on the order of 1 mm, such as between 0.5 mm and 2 mm, or 0.5 mm and 1 mm or approximately 0.75+/−0.1 mm. The height, for example, may be less than 1 mm. The conducting paths may have a length on the order of 1.0 mm, such as less than 1 mm. These dimensions have been found to provide enhanced performance of a system using cages, transceivers and receptacle connectors made according to an OSFP standard.

A spring seals as described herein has been found to provide improved high frequency performance for an electronic system with an I/O connector. Without being bound by any particular theory, the inventors theorize that the multiple peaks and valleys result in short conducting paths through the seal across the gap between the transceiver and the cage. These conducting paths will be shorter than spring fingers as shown in FIG. 5 needed to form a seal between the same two components. The inventors theorize that the space between the transceiver and the cage (or between any other components separated by a gap to be sealed with a spring seal) can resonate in operation. Resonance in a space including an opening can increase coupling of electromagnetic energy through that opening. Shorter conducting segments bounding an opening increases the frequency of the resonance that can be supported by that opening. Accordingly, having a seal with shorter conductive segments increases the frequency of resonance supported within a panel opening. Less overlap between frequency of resonance and the operating frequency range of the electronic system contributes to enhanced performance. Structures as described here may increase the frequency of such a resonance to be outside the operating range of electronic assemblies using high speed I/O connectors, such as those made according to an OSFP standards Designs as disclosed herein with multiple peaks and valleys facilitate shorter conductive segments bounding openings in a panel, contributing to enhanced performance, particularly in high frequency systems where resonances might otherwise degrade performance. For example, a seal as described herein may be useful such as at the high frequencies used with OSFP connectors.

FIG. 6 illustrates that the conducting segments between peaks and valleys extend for a distance S in the insertion direction. Were a similar spring shield implemented with a spring finger as in FIG. 5, the conducting paths through the shield would have a distance P, which is longer than the distance S.

FIG. 6 also shows additional details of an exemplary embodiment. For example, it can be seen in FIG. 6 that the spring seal has a maximum height H at a location corresponding to the central peak. Additional peaks, on either side of the central peak are lower. Such a configuration illustrates that the peaks may be of different heights. The height of the peaks, for example, may be selected (with or without slits as described above) to provide a desired spring force in the compression direction (indicated as perpendicular to the cage wall in FIG. 6).

As can be appreciated from the foregoing, a cage with a spring seal as described above may be used in a method of operating an electronic assembly comprising a receptacle accessible within a channel of a cage and having a spring seal at an opening to the channel. An exemplary method may comprise inserting a transceiver through the opening to the channel; contacting a first convex surface of the spring seal at a first distance from the opening; contacting a second convex surface of the spring seal at a second distance from the opening; and contacting a third convex surface of the spring seal at a third distance from the opening, such that the spring seal is compressed between the transceiver and a wall of the cage. The method may include mating the transceiver with a connector in the channel.

A spring seal used with this method may comprise a front portion adjacent the opening and a rear portion offset from the front portion in an insertion direction. The rear portion of the spring seal may move in the insertion direction when the spring seal is compressed.

Contacting the first convex surface may compress the spring seal to generate a first contact force between the first convex surface and the transceiver. Contacting the second convex surface may compress the spring seal to generate a second contact force between the second convex surface and the transceiver, and the second contact force may be greater than the first contact force.

Compressing the spring seal between the transceiver and a wall of the cage may forms a plurality of conducting paths between the transceiver and the wall of the cage that are less than 1 mm long.

Compressing the spring seal between the transceiver and the wall of the cage may form a plurality of ground connections between the transceiver and the wall of the cage. When the transceiver is operated at a high frequency, such as within an operating frequency range of an OSFP standard, the plurality of ground connections may suppress resonance in the operating frequency range in a space between the transceiver and the wall of the cage.

Having thus described several aspects of at least one embodiment of this invention, it is to be appreciated that various alterations, modifications, and improvements will readily occur to those skilled in the art.

For example, a spring seal as described herein may also be used between other components. A spring seal was described above as making electrical connections between a transceiver and a cage. In other embodiments, the spring seal may make multiple connections between a transceiver and another grounded structure of an electronic assembly with a receptacle I/O connector. In yet other embodiments, rather than a transceiver, the spring seal may be disposed between a passive plug or other pluggable component and a wall of the cage.

As another example, a cage with four walls bounding a channel opening is illustrated. In embodiments in which pluggable components that are not rectangular are inserted into the cage, there may be more or fewer interior walls of the cage, and therefore more or fewer spring seals around the perimeter of the opening into the cage.

As yet a further example, a spring seal is described in which the spring seal is fixed at the front and retained at the rear from movement in a direction perpendicular to the wall of the cage at the rear. The rear of the spring seal may be free to move in the insertion direction. Such a mounting enables the spring seal to elongate in the insertion direction when a transceiver is inserted into the cage. Such a configuration provides a softer spring force against the transceiver and provides less stress on the spring, reducing the chances of yield. In other embodiments, however, a higher spring force may be beneficial, and both the front and back of the spring may be secured to the cage so as to preclude movement in the insertion direction.

Moreover, it is not a requirement that there be a one-to-one relationship between interior walls of the cage and spring seals. In some embodiments, for example, there may be more than one spring seal per wall. Multiple spring seals, for example, may be aligned end to end to span the wall of the cage. Conversely, there may be some walls for which there is no spring seal. Such an embodiment may be useful in which an alternative type of shield is used for one or more walls and/or the transceiver is mounted asymmetrically in the channel of the cage. One wall of the transceiver, for example, may be pressed against a wall of the cage without an intervening spring seal. As a specific example, spring seals may line at least two walls of the cage.

For systems with greater variability in the positioning of the transceiver walls relative to the walls of the cage, the variability in the amount of compression required of the spring seal may also be greater. In such an embodiment, more slits may be formed than illustrated to provide a softer spring force for more compression without yielding.

As a further example of a possible variation, peaks and valleys are shown elongated in a direction perpendicular to the insertion direction. The peaks and valleys may be oriented at another angle transverse to the insertion direction or may be parallel to the insertion direction.

As yet another example of a possible variation, a spring seal was illustrated in use on a ganged cage with four channels, arranged side by side in a direction parallel to a surface of a printed circuit board to which the cage is attached. Spring seals as described herein may be used in connection with ganged cages with any number of side-by-side channels. Spring seals as described herein also may be used in connection with a stacked cage in which one or more channels are arranged above, in a direction parallel to a surface of a printed circuit board to which the cage is attached, another channel. A spring seal as described herein may also be used in a connector assembly with ganged, stacked cages or in connection with cages that are not ganged, whether single channel or stacked cages.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A spring seal for a cage of a connector assembly configured to receive a plug inserted in an insertion direction, the spring seal comprising:
- a conductive sheet comprising:
  - a plurality of peaks, each of the plurality of peaks comprising a curved surface configured to contact the plug; and
  - a plurality of valleys, each of the plurality of valleys comprising a curved surface configured to contact the cage, wherein:
    - the plurality of peaks are separated by valleys of the plurality of valleys in the insertion direction.

2. The spring seal of claim 1, wherein the conductive sheet further comprises a plurality of openings elongated in the insertion direction.

3. The spring seal of claim 2, wherein:
- the spring seal comprises a front portion, a rear portion and a central portion between the front portion and the rear portion;
- openings of the plurality of openings are disposed in the front portion and central portion; and
- an average spacing between openings of the plurality of openings in the front portion is between 30% and 70% of the average spacing between openings of the plurality of openings in the central portion.

4. The spring seal of claim 3, wherein:
- the openings of the plurality of openings in the central portion are aligned with the openings of the plurality of openings in the front portion such that conducting paths from the peaks to the valleys are provided between the openings.

5. The spring seal of claim 1, wherein:
- valleys of the plurality of valleys are between respective pairs of adjacent peaks of the plurality of peaks.

6. The spring seal of claim 5, wherein:
- a height of each peak of the plurality of peaks relative to an adjacent valley of the plurality of valleys is less than 1 mm when the spring seal is in an uncompressed state.

7. The spring seal of claim 5, wherein:
- the spring seal comprises conducting paths between peaks and valleys less than 1 mm long.

8. A connector assembly, comprising:
- a receptacle connector within a cage comprising a channel with an opening; and
- a plurality of spring seals disposed at the opening of the channel, each of the plurality of spring seals comprising:
  - a corrugated sheet comprising:
    - a plurality of peaks each comprising a surface curving toward a first direction,
    - a plurality of valleys each comprising a surface curving toward a direction opposite to the first direction, and
    - a plurality of conducting paths between each of the plurality of peaks and an adjacent valley of the plurality of valleys, wherein each of the plurality of conducting paths has a length of 1 mm or less.

9. The connector assembly of claim 8, wherein:
- the channel is bounded by a plurality of walls of the cage; and
- for each of the plurality of spring seals:
  - the spring seal has a front portion adjacent the opening of the channel and a rear portion opposite the front portion; and
  - the rear portion of the spring seal is movably coupled to a respective wall of the plurality of walls.

10. The connector assembly of claim 9, wherein:
- for each of the plurality of spring seals:
  - the front portion of the spring seal is clipped to the respective wall of the plurality of walls.

11. The connector assembly of claim 8, wherein:
- the channel is bounded by a plurality of walls of the cage; and
- for each of the plurality of spring seals:
  - the spring seal is coupled to a respective wall of the plurality of walls of the cage;

a first peak of the plurality of peaks is disposed between a second peak of the plurality of peaks and a third peak of the plurality of peaks; and when the spring seal is in an uncompressed state, a height of the first peak relative to the respective wall of the cage is greater than heights of the second peak and the third peak.

12. The connector assembly of claim 11, wherein:

the channel comprises an insertion direction extending from the opening towards the receptacle connector; and for each of the plurality of spring seals:

the corrugated sheet comprises a plurality of slits that are elongated in the insertion direction, with slits of the plurality of slits disposed on the first peak, the second peak and the third peak; and average spacing between slits of the plurality of slits on the first peak is greater than the average spacing between slits of the plurality of slits on the second peak and the third peak.

13. A connector assembly, comprising:

a receptacle connector within a cage comprising a channel with an opening; and a plurality of spring seals disposed at the opening of the channel, each of the plurality of spring seals comprising:

a corrugated sheet comprising a plurality of peaks and a plurality of valleys, with conducting paths between each of the plurality of peaks and an adjacent valley of the plurality of valleys having a length of 1 mm or less, wherein:

the channel is bounded by a plurality of walls of the cage;

each of the plurality of spring seals is attached to a respective wall of the plurality of walls of the cage;

the connector assembly is in combination with a transceiver inserted into the channel in an insertion direction; and for each of the plurality of spring seals:

the plurality of peaks contact a transceiver at at least three locations, separated in the insertion direction; and the plurality of valleys contact the respective wall of the cage at at least three locations, separated in the insertion direction.

14. A method of operating an electronic assembly comprising a receptacle accessible within a channel of a cage having a spring seal at an opening to the channel, the method comprising:

inserting a transceiver through the opening to the channel in an insertion direction;

contacting a first convex surface of the spring seal at a first distance from the opening;

contacting a second convex surface of the spring seal at a second distance from the opening; and contacting a third convex surface of the spring seal at a third distance from the opening, wherein the second convex surface is offset from the first convex surface in the insertion direction, and the third convex surface is offset from the second convex surface in the insertion direction, such that the spring seal is compressed between the transceiver and a wall of the cage.

15. The method of claim 14, further comprising:

mating the transceiver with a connector in the channel.

16. The method of claim 14, wherein:

the spring seal comprises a front portion adjacent the opening and a rear portion offset from the front portion in an insertion direction; and the rear portion of the spring seal moves in the insertion direction when the spring seal is compressed.

17. The method of claim 14, wherein:

contacting the first convex surface compresses the spring seal to generate a first contact force between the first convex surface and the transceiver;

contacting the second convex surface compresses the spring seal to generate a second contact force between the second convex surface and the transceiver; and the second contact force is greater than the first contact force.

18. The method of claim 14, wherein:

compressing the spring seal between the transceiver and a wall of the cage forms a plurality of conducting paths between the transceiver and the wall of the cage that are less than 1 mm long.

19. The method of claim 14, wherein:

compressing the spring seal between the transceiver and the wall of the cage forms a plurality of ground connections between the transceiver and the wall of the cage.

20. The method of claim 19, further comprising:

operating the transceiver in an operating frequency range of OSFP standard as of Jun. 8, 2021 such that the plurality of ground connections suppress resonance in the operating frequency range in a space between the transceiver and the wall of the cage.

* * * * *